United States Patent
Chen et al.

(10) Patent No.: US 10,810,260 B2
(45) Date of Patent: Oct. 20, 2020

(54) SYSTEM AND METHOD FOR AUTOMATICALLY GENERATING ARTICLES OF A PRODUCT

(71) Applicants: Beijing Jingdong Shangke Information Technology Co., Ltd., Beijing (CN); JD.com American Technologies Corporation, Mountain View, CA (US)

(72) Inventors: Li Chen, Belmont, CA (US); Jianxun Sun, Beijing (CN); Jixing Wang, Beijing (CN); Huiman Hou, Beijing (CN); Yingqiu Tian, Beijing (CN); Hui Zhou, Sunnyvale, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 136 days.

(21) Appl. No.: 16/114,592

(22) Filed: Aug. 28, 2018

(65) Prior Publication Data
US 2020/0074013 A1    Mar. 5, 2020

(51) Int. Cl.
| | |
|---|---|
| *G06F 16/9032* | (2019.01) |
| *G06Q 30/06* | (2012.01) |
| *G06F 40/30* | (2020.01) |
| *G06F 40/247* | (2020.01) |
| *G06N 3/02* | (2006.01) |

(Continued)

(52) U.S. Cl.
CPC ...... *G06F 16/90332* (2019.01); *G06F 40/247* (2020.01); *G06F 40/30* (2020.01); *G06F 40/56* (2020.01); *G06N 3/02* (2013.01); *G06N 20/00* (2019.01); *G06Q 30/0627* (2013.01)

(58) Field of Classification Search
CPC .......... G06N 20/00; G06N 3/02; G06F 40/56
See application file for complete search history.

(56) References Cited

U.S. PATENT DOCUMENTS

| | | | | |
|---|---|---|---|---|
| 5,873,765 A | * | 2/1999 | Rifkin | A63H 3/28 446/143 |
| 8,359,285 B1 | * | 1/2013 | Dicker | G06Q 30/02 705/26.1 |

(Continued)

OTHER PUBLICATIONS

M Melnik, J Alm, Does a seller's ecommerce reputation matter? Evidence from eBay auctions, The journal of industrial economics, 2002, vol. 50, pp. 337-349.

(Continued)

*Primary Examiner* — Samuel G Neway
(74) *Attorney, Agent, or Firm* — China Science Patent & Trademark US LLC; Shanyun Lu

(57) ABSTRACT

A method and system for generating an article of a product. The method includes: receiving a request from a user; when the request include an identification of the product, retrieving traits of the product from a trait database, when the request include keywords, retrieving the traits of the product by comparing the similarity between the keywords and the traits or the synonym of the traits; generating candidate sentences corresponding to the traits; selecting sentences from the candidate sentences, and revising and rearranging the sentences to generate the article.

17 Claims, 13 Drawing Sheets

(51) Int. Cl.
*G06F 40/56* (2020.01)
*G06N 20/00* (2019.01)

(56) References Cited

U.S. PATENT DOCUMENTS

| | | | | |
|---|---|---|---|---|
| 8,799,100 | B2 | 8/2014 | Walker et al. | |
| 2005/0050469 | A1* | 3/2005 | Uchimoto | G06F 40/268 |
| | | | | 715/256 |
| 2007/0255589 | A1* | 11/2007 | Rodriguez | G16H 70/20 |
| | | | | 705/2 |
| 2011/0055046 | A1* | 3/2011 | Bowen | G06Q 10/08 |
| | | | | 705/26.41 |
| 2013/0066873 | A1* | 3/2013 | Salvetti | G06Q 30/0278 |
| | | | | 707/738 |
| 2016/0314507 | A1* | 10/2016 | Tedjamulia | G06Q 30/0282 |
| 2017/0017722 | A1* | 1/2017 | Henderson | G06F 16/9535 |
| 2017/0302736 | A1* | 10/2017 | Hudda | H04L 67/1095 |
| 2019/0311210 | A1* | 10/2019 | Chatterjee | G06F 16/58 |
| 2020/0074013 | A1* | 3/2020 | Chen | G06F 40/30 |

OTHER PUBLICATIONS

P Lee. Behavioral model of online purchasers in e-commerce environment, Electronic Commerce Research, 2002, vol. 2, pp. 75-85.

Y Zhang, Y Fang, K Wei, et al. Repurchase intention in B2C e-commerce—A relationship quality perspective, Information & Management, 2011, vol. 48, pp. 192-200.

* cited by examiner

| Attributes | Trait 1 | Trait 2 |
|---|---|---|
| writing_style | descriptive | literary |
| gender | male | female |
| season | spring | summer |
| color | red | white |
| fabric | cotton | silk |
| thickness | thin | thick |
| sleeve | long | short |
| collar | round | V |
| scene | business | home |
| dress-function | water proof | cold proof |

FIG. 9D

SYSTEM AND METHOD FOR AUTOMATICALLY GENERATING ARTICLES OF A PRODUCT

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to generating articles automatically, and more particularly to system and methods for automatically generating articles describing e-commerce products on an online platform.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

E-commerce has been a significant part of social life. Every day, there are billions of merchandise products for sale on online retail platforms such as amazon.com, jd.com and alibaba.com. Many of the products come with minimal textual descriptions, which makes it difficult for consumers to have a cognitive, comprehensive perception, not to mention interests in a purchase.

Manual writing of high-quality textual descriptions seems a solution to the problem. However, given the huge number of merchandise products, it is extremely labor-intensive.

Therefore, a demand exists in the art to address the aforementioned deficiencies and inadequacies.

SUMMARY

In certain aspects, the present disclosure relates to a method for generating an article of a target product. In certain embodiments, the method includes: receiving, by a computing device, a request from a user, the request comprising at least one of a keyword and an identification of the target product; determining at least one target trait of the target product based on the request; generating a plurality of candidate sentences corresponding to the target trait; selecting a plurality of target sentences from the candidate sentences based on an instruction from the user; and generating the article based on the target sentences.

In certain embodiments, the step of determining the at least one target trait includes: determining if the request comprising the keyword or the identification of the target product; when the request comprises the identification of the target product: retrieving the at least one target trait from a trait database, the trait database comprising identifications of products and corresponding traits of the products; and when the request comprises the keyword of the target product: determining the at least one target trait by comparing the keyword of the target product to a synonym dictionary, dictionary words in the synonym dictionary comprising traits and synonyms of the traits.

In certain embodiments, the identification of the target product is stock keeping unit (SKU) of the target product.

In certain embodiments, the step of comparing the keyword to the synonym dictionary comprises: matching the keyword to the dictionary words, and when there is no match, calculating a similarity between the keyword and the dictionary words, and defining the dictionary word having the highest similarity to the keyword as the trait of the target product.

In certain embodiments, the similarity between the keyword and the dictionary words are calculated using machine learning.

In certain embodiments, the step of generating the plurality of candidate sentences includes: selecting the candidate sentences corresponding to the target trait; determining collision between the candidate sentences and the target trait; removing the candidate sentences with collision to obtain filtered sentences; extracting traits reflected in each of the filtered sentences; and ranking the filtered sentences based on a fit value between reflected traits of each of the filtered sentences and the target traits of the product. The fit value is calculated based on a number of same traits between the reflected traits of each filtered sentence and the target traits.

In certain embodiments, the method further includes adding a new sentence to the filtered sentences, the new sentence being generated by: replacing a verb or an adjective in one of the filtered sentences by a synonym word.

In certain embodiments, the method further includes adding a new sentence to the filtered sentences, the new sentence being generated by: parsing one of the filtered sentences into syntactic components; and reorganizing the syntactic components into a syntactic structure different from that of the one of the filtered sentences.

In certain embodiments, the step of selecting the plurality of target sentences includes: selecting one target sentence from the filtered sentences based on the ranking of the filtered sentences; removing the selected one target sentence from the filtered sentence, and re-ranking the rest of the filtered sentences; and selecting another target sentence from the rest of the filtered sentences that are re-ranked.

In certain embodiments, the step of generating the article based on the target sentences comprises: providing an interface for revising the target sentences and re-arranging the target sentences.

In certain aspects, the present disclosure relates to a system for generating an article of a target product. In certain embodiments, the system includes a computing device. The computing device has a processor and a storage device storing computer executable code. The computer executable code, when executed at the processor, is configured to perform the method described above.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIGS. 9A-9D schematically show an interface of article generation application according to certain embodiments of the disclosure.

DETAILED DESCRIPTION

Figure 1:
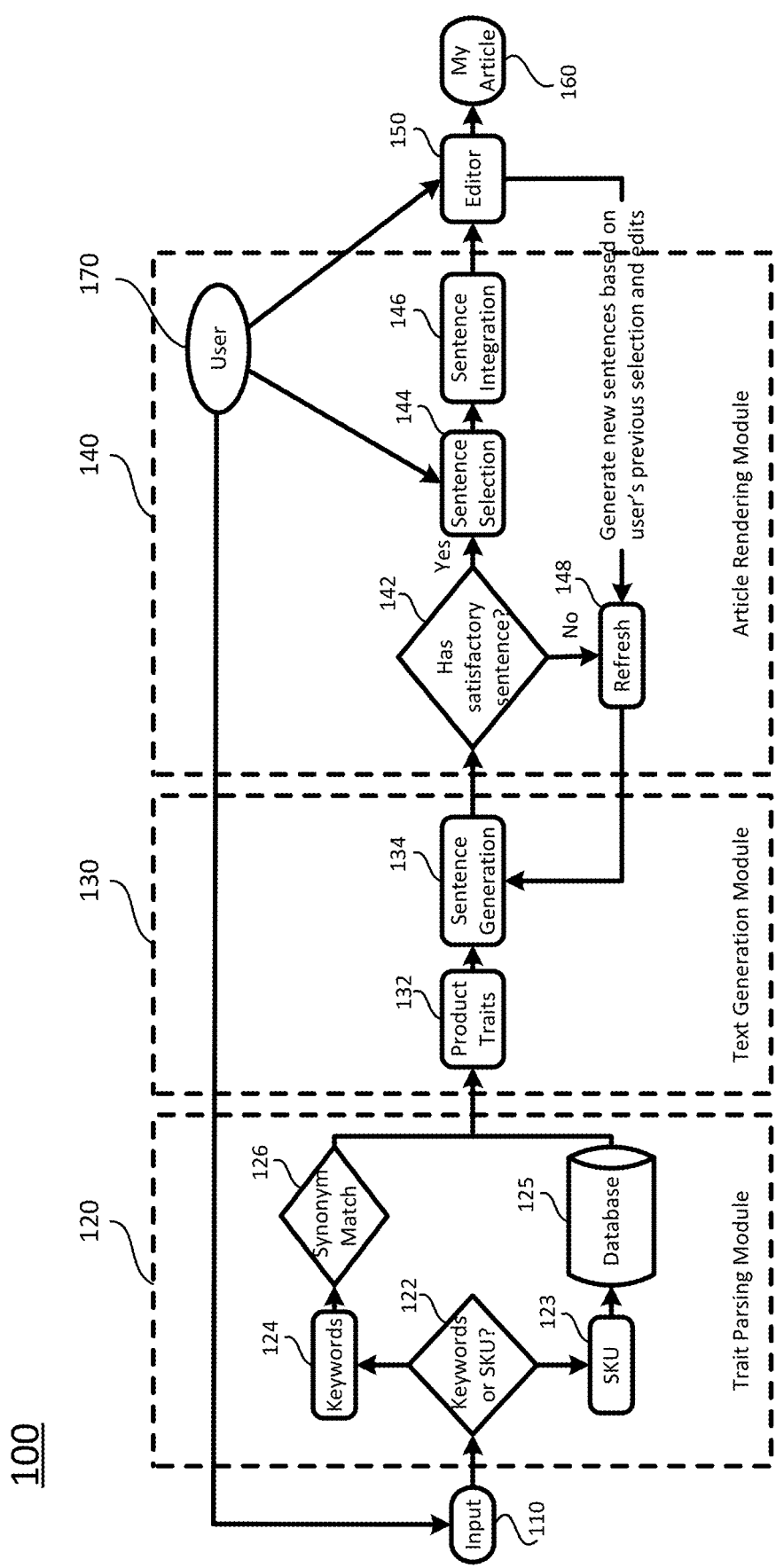
FIG. 1 schematically depicts an article generating system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

With the increasing number of products listed on e-commerce platforms, there is a need to promote sales of the products by providing high quality articles describing the products. However, when the articles of the products are written manually, it is hard to scale up the writing process, the cost is high, and the efficiency is low.

In certain aspects, the present disclosure develops a computer aided article or content generating system, to significantly facilitate the generation of advertisement content, such as merchandise description, advertisement statements, articles, etc., which eventually enhance sales and user experience.

In certain embodiments, a novel software system is provided using advanced artificial intelligence (AI) techniques to automatically generate high-quality texts based on SKU id or keywords that describe the merchandise product. The AI generated texts, coupled with an online text editor, provide writers readily available materials for them to select, edit and submit. Comparing to traditional way-writing from scratch, this system expedites the article writing process significantly. The system hosts a web interface where users can input keywords, select AI-generated texts, refresh/edit them and submit. The AI is trained based on historical e-commerce textual content, written by professional writers, and self-refined constantly based on users' feedback (users' rating, selection and editing of AI-generated texts). In other words, the present disclosure provides a system that embeds AI to facilitate writing in ecommerce context, by integrating techniques including natural language processing, machine learning, web user interface (UI) and software engineering. The system, among other things, is able to overcome the disadvantages of the human writing solution: (1) scale—the system can generate as many texts as needed; (2) efficiency—the system generates thousands of sentences per second per user; (3) cost-cost of electricity, internet service and computer depreciation are negligibly small, compare to professional writers' labor.

FIG. 1 schematically depicts an article generating system according to certain embodiments of the present disclosure. As shown in FIG. 1, the system 100 includes an input module 110, a trait parsing module 120, a text generation module 130, an article rendering module 140, an editor module 150, and a "my article" module 160.

When a user 170 wants to generate text content, the system 100 needs to know the user's intention: which item the content is to describe, which trait of the item is most appealing, which writing style is most appropriate. Hence, the system 100 provides users 170 an input box for them to enter item SKU or keywords, as the input 110.

In the field of inventory management, SKU is a distinct type of item for sale, such as a product or service, and all attributes associated with the item type that distinguish it from other item types. For a product, these attributes could include manufacturer, description, material, size, color, packaging, and warranty terms. When a business takes inventory of its stock, it counts the quantity it has of each SKU. SKU can also refer to a unique identifier or code that refers to the particular stock keeping unit. These codes are not regulated or standardized. When a company receives items from a vendor, it has a choice of maintaining the vendor's SKU or creating its own. In certain embodiments, the SKU refers to a unique identifier, such as a number having 8-16 digits.

In response to receiving the input 110, the system 100 judges at procedure 122 if the input 110 is an SKU 123 or keywords 124—if the former, the system 100 queries internal database 125 to find attributes associated with this SKU 123; if the latter, the system 100 queries synonyms dictionary at procedure 126 to find products traits 132 that are synonymous to the keywords, where the traits are values of the attributes of the product. To sum, the trait parsing module 120 translates inputs 110 as traits 132 of products.

Then at procedure 134, in response to receiving the traits 132 of products, the text generation module 130 employs AI algorithms to generate sentences based on the product traits 132.

The article rendering module 140 provides a web interface, to present AI-generated sentences to the user 170, such that the user 170 may select and refresh the sentences. Refresh happened under two scenarios: (1) the user wants more sentence candidates, and (2) right after the user selected a sentence as a selection. In the scenario (2), sentence candidates that carry duplicate traits as the selected sentence are removed from the sentence candidate list. Because a part of traits have been represented by the selected sentence, there is no need to add similar sentences any more. The refresh is to remove such sentences from search result. As shown in FIG. 1, the system 100 judges at procedure 142 if satisfactory sentence is available. If so, the user 170 selects at procedure 144 the satisfactory sentences, and at procedure 146 integrate the satisfactory sentences. If the satisfactory sentence is not available, at procedure 148, the system refreshes to generate different sentences or more sentences for further judgement.

After integration of the sentences, the user 170 uses the editor 150 to construct the individual sentences to an article. The editor 150 provides flexible interaction interface for users: users can drag sentences to change their layout order; users can edit texts within the sentences; users can delete the whole sentence; users can write texts by their own. The edits and merged article may be submitted by the user 170 to a web service, or may be saved for later submission. Moreover, the edits are passed back to the algorithm & model in text generation module 130, to improve the algorithm & model, for example by re-training the model.

The my article module 160 is used to store previously saved/submitted articles, so that users 170 can search their previous works and reuse them.

Figure 2:
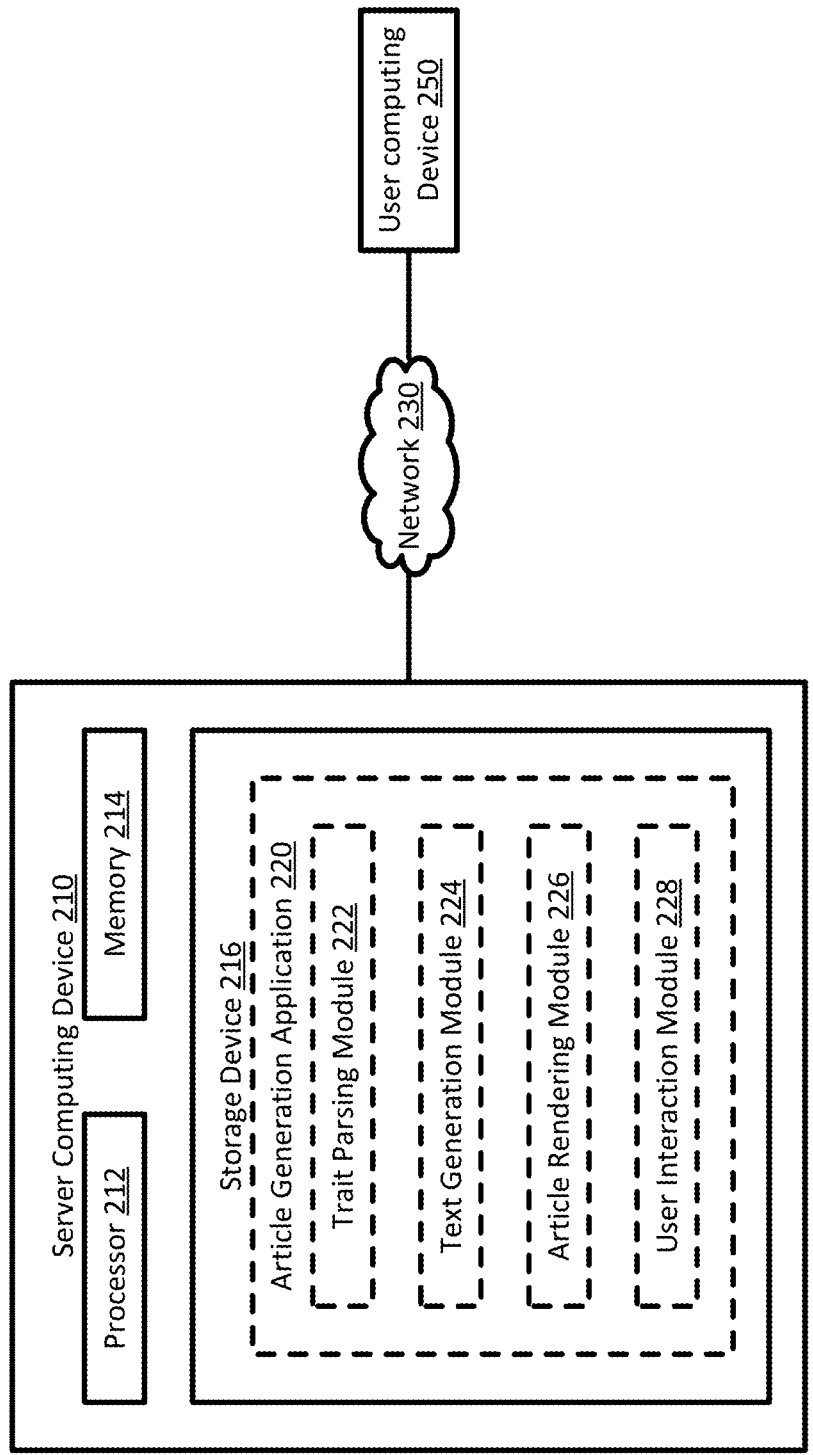
FIG. 2 schematically depicts an article generating system according to certain embodiments of the present disclosure.

FIG. 2 schematically depicts an article generating system according to certain embodiments of the present disclosure. The system 200 shown in FIG. 2 and the system 100 shown in FIG. 1 are different ways of showing the same or similar system. As shown in FIG. 2, the system 200 includes a server computing device 210, one or more user computing devices 250, and a network 230 connecting the user computing devices 250 with the server computing device 210.

The server computing device 210 may function as a server or a host computer. In certain embodiments, the server computing device 210 may be a server computer, a cluster, a cloud computer, a general-purpose computer, or a specialized computer, which provides article generation service. In certain embodiments, the user computing device 250 may be a cloud computer, a mobile device, a tablet, a general-purpose computer, a headless computer, a wearable device, or a specialized computer, which have access to the article generation service provided by the server computing device 210. In certain embodiments, the network 230 may be a wired or wireless network, and may be of various forms, such as a public network and a private network. Examples of the network may include, but not limited to, the LAN or a wide area network (WAN) including the Internet. In certain embodiments, two or more different networks and/or interfaces may be applied to connect the server computing device 210 to the user computing devices 250. In certain embodiment, the network 230 may also be a system interface, a universal serial bus (USB) interface.

As shown in FIG. 2, the server computing device 210 may include, without being limited to, a processor 212, a memory 214, and a storage device 216. In certain embodiments, the server computing device 210 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 212 may be a central processing unit (CPU) which is configured to control operation of the server computing device 210. The processor 212 can execute an operating system (OS) or other applications of the server computing device 210. In some embodiments, the server computing device 210 may have more than one CPU as the processor, such as two CPUs, four CPUs, eight CPUs, or any suitable number of CPUs. The memory 214 can be a volatile memory, such as the random-access memory (RAM), for storing the data and information during the operation of the server computing device 210. In certain embodiments, the memory 214 may be a volatile memory array. In certain embodiments, the server computing device 210 may run on more than one memory 214. The storage device 216 is a non-volatile data storage media for storing the OS (not shown) and other applications of the server computing device 210. Examples of the storage device 216 may include non-volatile memory such as flash memory, memory cards, USB drives, hard drives, floppy disks, optical drives, solid-state drive (SSD) or any other types of data storage devices. In certain embodiments, the storage device 216 may be a local storage, a remote storage, or a cloud storage. In certain embodiments, the server computing device 210 may have multiple storage devices 216, which may be identical storage devices or different types of storage devices, and the applications of the server computing device 210 may be stored in one or more of the storage devices 216 of the computing device 210. As shown in FIG. 2, the storage device 216 includes an article generation application 220. The article generation application 220 provides a platform for generating articles efficiently.

The article generation application 220 includes, among other things, a trait parsing module 222, a text generation module 224, an article rendering module 226, and a user interaction module 228. In certain embodiments, the article generation application 220 may include other applications or modules necessary for the operation of the modules 222-228. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some or all of the modules of the article generation application 220 may be located at a remote computing device or a cloud device.

Figures 3A, 3B:
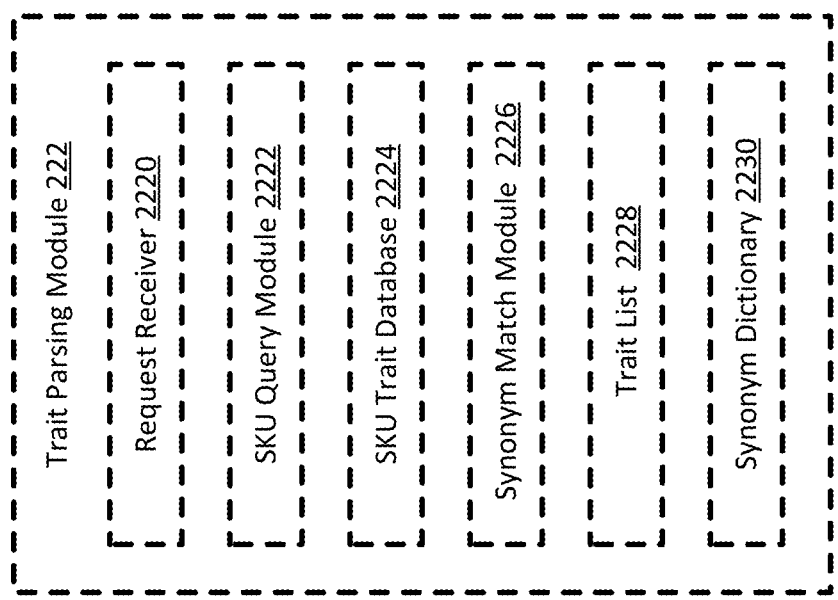
FIG. 3A schematically depicts a trait parsing module according to certain embodiments of the present disclosure.
FIG. 3B schematically depicts attributes and traits according to certain embodiments of the present disclosure.

The trait parsing module 222 is configured to, upon receiving an input from a user via an interaction interface such as a graphic user interface (GUI), parse the input to obtain one or more traits of one or more products, and send the traits to the text generation module 224. Referring to FIG. 3A, the trait parsing module 222 includes submodules and data, specifically a request receiver 2220, an SKU query module 2222, an SKU trait database 2224, a synonym match module 2226, a product trait list 2228, and a synonym dictionary 2230. The request receiver 2220 is configured to receive a request or the input from the user. The request may include keywords of a product or SKU of a product inputted by the user. The request receiver 2220 is then configured to send the SKU to the SKU query modul 2222 or/and send the keywords to the synonym match module 2226.

The SKU query module 2222 is configured to, in response to receiving the SKU, query the SKU trait database 2224 using the SKU, to obtain the product trait or traits corresponding to the product having the SKU. The SKU trait database 2224 is also named product attribute database, where the traits of the product are values of certain attributes of the products. Each product is identified by its specific SKU, and the traits of the product is stored in the database and linked to the SKU. In other words, each SKU corresponds to or identifies one of the products, and each product is labeled with one or more traits as values of certain attributes. By query the SKU trait database 2224, the traits corresponding to the product having the SKU is directly retrieved. Normally, the request by the user only includes one SKU corresponding to one product. In certain embodiments, the request may also include two or more SKUs and one or more corresponding products, and traits for multiplr products are generated by the SKU query module 2222. In certain embodiments, the SKU traits database 2224 is generated automatically using the information inputted by merchandises or sellers of the products. In certain embodiments, the traits of the products may also be labeled or checked manually.

FIG. 3B schematically depicts attributes and traits according to certain embodiments of the present disclosure. In certain embodiments, as shown in FIG. 3B, there are a total of ten defined attributes, including writing_style, gender, season, color, fabric, thickness, sleeve, collar, scene, and dress-function. Each attribute has multiple values, that is, traits. Those traits are used to label sentences. In certain embodiments, the ten attributes includes a total of 300-400 traits. The trait 1 and trait 2 for each of the attributes are examples only, and don't represent their sequence in the attributes. Further, there is no correspondence between the trait 1 of one attribute and trait 1 of another attribute; and there is no correspondence between the trait 2 of one attribute and trait to of another attribute. In certain embodiments, the attributes and the traits are stored in the trait list 2228, and are easily expandable by adding new entries to the trait list 2228.

The synonym match module 2226 is configured to, in response to receiving the keyword or keywords, obtain trait or traits of the product corresponding to the keyword. In certain embodiments, the synonym match module 2226 performs its function using deep learning as follows. First, the synonym module 2226 matches the keyword entered by the user to the trait words stored in the trait list 2228, to see if there are exact match. If exact match is found, the matched traits are regarded as the parsed traits of the product. Second, if exact match is not found, the synonym module 2226 performs surrogate match using a synonym dictionary 2230, so as to obtain trait that is most similar to the inputted keyword. As a schematically example, the synonym dictionary 2230 is in a form of:

$$D=\{W_1:[S_{11}, S_{12}, \ldots, S_{1p(1)}], W_2: [S_{21}, S_{22}, \ldots, S_{2p(2)}], \ldots, Wn: [S_{n1}, Sn_2, \ldots, Sn_{np(n)}]\},$$

D is the synonym dictionary, $W_1$ is the first word in the synonym dictionary, and $S_{11}, S_{12}, \ldots, S_{1p(1)}$ are a total of p(1) number of synonyms of the word $W_1$; $W_2$ is the second word in the synonym dictionary, and $S_{21}, S_{22}, \ldots, S_{2p(2)}$ are a total of p(2) number of synonyms of the word $W_2$; $W_n$ is the nth word in the synonym dictionary, and $S_{n1}, S_{n2}, S_{np(n)}$ are a total of p(n) number of synonyms of the word $W_n$. The train list 2228 is in a form of:

$$T=\{t_1, t_2, \ldots, t_q\}$$

For a specific keyword $W_{input}$ entered by the user, the procedure of mapping the keyword to the trait follows the pseudo code:

```
if W_input in D:
    if D [W_input] is not empty:
        mapped_attribute = D [W_input] & T
    else:
        mapped_trait = find_surrogate (W_input)
```

D [$W_{input}$]& T results a mapped attribute t from the attribute list T if the trait word t matches, or in other words the same as, the word $W_{input}$ or any synonyms word of the $W_{input}$. The function "find_surrogate( )" is to find the trait most similar to the entered keyword. Here "similarity" is defined based on the word's contexts. In certain embodiments, the function retrieves a large corpus, e.g. Wikipedia corpus, find two groups of sentences including the two words, respectively. Then the function extracts the context words around these two words in each group of sentences. Each word is defined by a vector, and the distance between two words is based on the co-occurrence of the two words in the sentences. Finally, the function compares the two vectors of the two context words, and see if they are similar based on their distance. The more similar they are, the more likely the two words can be surrogate in each other's context. By the above procedure, for an input keyword, the function find the trait that has most similar context word vector. In certain embodiments, the find_surrogate( ) is performed using a deep learning method, such as an AI. During operation of the article generation application 220, an entered keyword can be transformed to a vector by the AI, and the vector is compared to the vectors of the traits, so as to find the trait that is most closely related to the entered keyword. By using the SKU query, trait list matching, and finally synonym match (including find surrogate) sequentially (or non-sequentially in certain embodiments), the trait parsing module 222 is able to find one or more traits based on the inputs of the user.

Figure 4B:
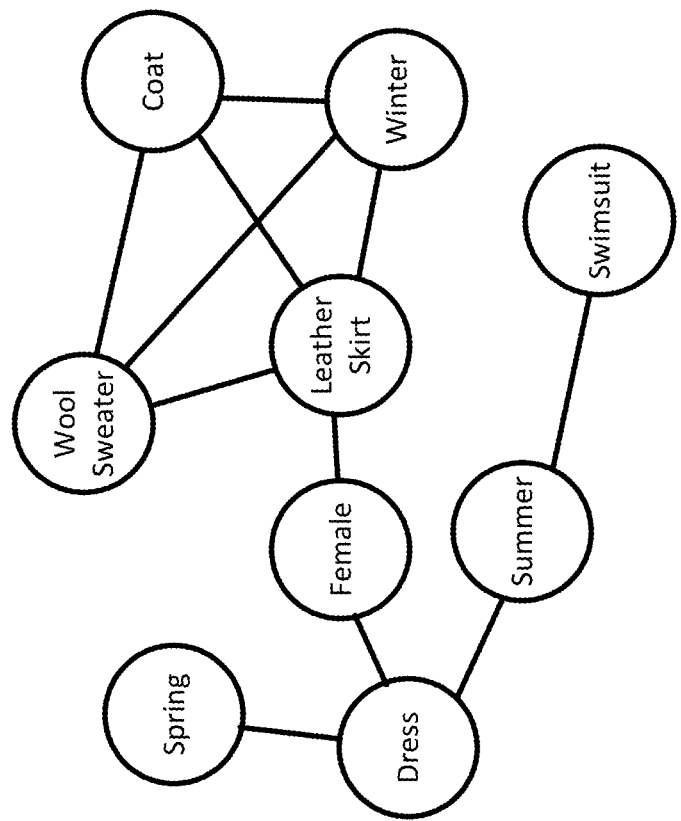
FIG. 4B schematically shows a knowledge graph presenting the pairwise co-occurrence of attributes.
Figure 4A:
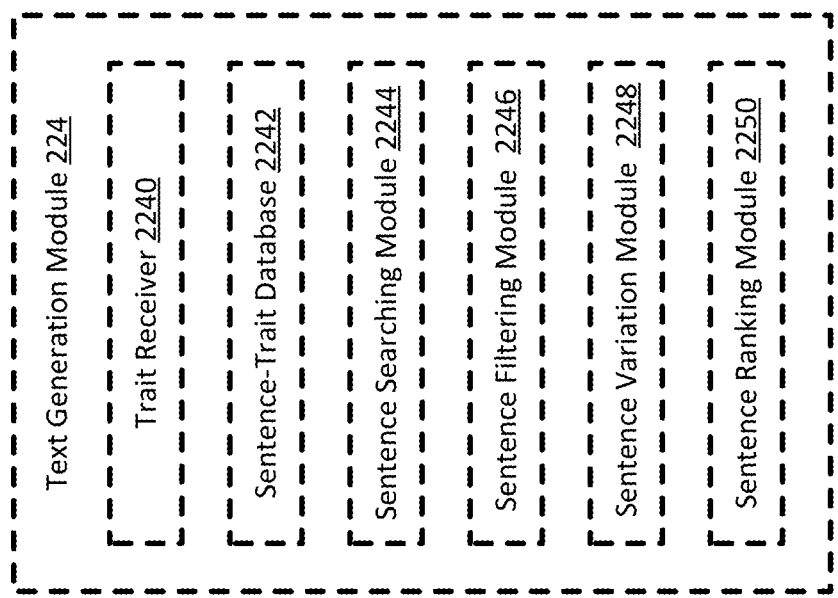
FIG. 4A schematically depicts a text generation module according to certain embodiments of the present disclosure.

The text generation module 224 is configured to, in response to receiving the traits from the trait parsing module 222, generate sentences based on the traits of the product, and provides the generated sentences to the article rendering module 226. Referring to FIG. 4A, the text generation module 224 includes submodules and data, specifically a trait receiver 2240, a sentence-trait database 2242, a sentence selection module 2244, a sentence filtering module 2246, a sentence variation module 2248, and a sentence ranking module 2250. The trait receiver 2240 is configured to receive the traits from the trait parsing module 222. The sentence-trait database 2242 stores cleaned sentences that are labeled with trait(s). The sentence searching module 2244 is configured to search sentences from the sentence-trait database 2242 based on the trait received by the trait receiver 2240. The sentence filtering module 2246 is configured to remove searched sentences that have trait collision so as to obtain filtered sentences. The sentence variation module 2248 is configured to vary the filtered sentences to obtain variant sentences. The sentence ranking module 2250 is configured to rank the filtered sentences or the variant sentences based on the number of traits.

The trait receiver 2240 is configured to receive the traits from the SKU query module 2222 when the input from the user is an SKU of the product or receive traits from the synonym match module 2226 when the input from the user is keyword or keywords of the product. The received traits may be one or more.

The sentence-trait database 2242 stores sentences that are labeled with traits, and the sentence-trait database 2242 can be used to train a deep learning module to generate sentences. In certain embodiments, the text generation module 224 performs its function using one or more deep learning models, and the deep learning model or models may correspond to the sentence searching module 2244, the sentence filtering module 2246, the sentence variation module 2248, and the sentence ranking module 2250. In certain embodiments, the creation of the sentence-trait database 2242 includes data acquisition, data cleaning, and data labeling. The data is high-quality textual content in e-commerce context, written by professional writers. In certain embodiments, these texts were collected from professional writers that worked for e-commerce platforms, and with the permission of the platform, texts can be extracted from internal database or via web crawling. The raw texts from, for example web crawling, is noisy because web crawling also extracts texts unrelated to products, such as webpage subtitles, name of buttons on the webpage, user comments, side bar ads, etc. Therefore, after data acquisition, the noise is then semi-automatically removed, i.e. computer removed based on patterns such as location on the webpage and special characters, under human supervision. After that, each piece of textual content (e.g. the whole body of a product description) is cut into sentences and stored sequentially in database, where the sentence may have an index indicating the article or paragraph the sentence come from and the sequential number of the sentence in the article or the paragraph. The correspondence between the content and its member sentences are kept, and the order of the sentences are also kept. In addition to texts themselves, label of the texts is also indispensable to success of deep learning or artificial intelligence (AI). The label establishes the connection between texts and their usage context-merchandise products. Therefore, the label is defined based on traits that merchandise projects. However, there are thousands of possible traits for all merchandise products. In certain embodiments, only the consumer-concerned traits are used, which decrease the number of representable traits to hundreds. More importantly, to maximally enhance user experience, the style of writing should vary from product to product (imagine literary, poetic style for fashion products vs. plain numeric style for electronic products). As a result, the style of writing is also defined as traits. Below are the details how we define representable traits.

First, a group of attributes are defined, each with a number of traits, as their possible value. The attributes and exemplary traits of the attributes are shown in FIG. 3B. For example, attribute "writing style" can be valued as trait "literary" or trait "descriptive," attribute "gender" can be valued as trait "male" or trait "female." Then each sentence is manually labeled, attribute by attribute, trait by trait. A sentence can be labeled by one or multiple traits. The rule of labeling is semantic—not only superficial literal meaning but also hidden inferable/implied meaning. In certain embodiments, the well-trained text generation module 224 may further be used to process raw text that are not labeled, obtain trait labels of the text, and store the processed text with labeled traits to the sentence-trait database 2242.

The sentence searching module 2244 is configured to search the one or more traits against the sentence-trait database 2242, so as to obtain sentences containing at least one of the traits, those search results are also named searched sentences. The number of searched sentences may vary based on the one or more traits. In certain embodiments, given a set of expected traits, the sentence searching module 2244 applied deep learning or AI algorithms to search sentences carrying the same traits. The search algorithm considers the set of traits as a whole instead of individually, which means the more input traits a sentence carries, the higher ranked the sentence is in search result. The search algorithm also considers the order of sentences, where sentence that carries the first expected traits are ranked higher than others. Further, the algorithm considers synergy of sentences. The system allows users select sentences progressively. If a user selected a sentence, the algorithm will take this selection as additional inputs and update the search result for a better synergy between sentences. In details, if a sentence is selected, which means its carrying traits have already been presented, the next sentences to be searched is better to be those carrying complementary traits.

The sentence filtering module 2246 is configured to filter the searched sentences to remove collision. For sentence filtering purpose, a machine learning classifier is first applied to calculate probability that each sentence reflects each product attribute. In certain embodiments, a correlation between a sentence and a trait is defined by a number between 0 and 1, where 0 means that the sentence is not related to the trait, 1 means that the sentence is related to the trait, and a high score such as 0.9 means that the sentence is likely related to the trait. Then a knowledge graph is built to define collisions between product attributes. Collision means the sentence attribute cannot co-exist with one of the product attributes: for example, "female" vs. "male", "summer" vs. "wool coat", "suit" vs. "casual", "high heels" vs. "sports". To build the knowledge graph, the co-occurrence frequency between product attributes in texts are assessed. If two product attributes seldom co-occur in a single sentence, then the pair of these two attributes is an instance of collision. FIG. 4B schematically shows a knowledge graph presenting the pairwise co-occurrence of attributes. As shown in FIG. 4B, attribute spring, summer, and winter are values of the attribute "season," and they are collision values because they don't have co-occurrence. In certain embodiments, the knowledge graph is stored in the sentence-trait database 2242. On the contrary, the traits that co-occurrence a lot don't have collision. In certain embodiments, the knowledge graph is build using an AI.

After building the model and the knowledge graph, sentences can be selected based on the AI sentence searching model and the knowledge graph. In certain embodiments, the trait receiver 2240 receives one or more product traits from the trait parsing module 222, and the sentence searching module 2244 provides searched sentences based on the product traits. Then the sentence filtering module 2246 extracts the sentence traits from the searched sentence. When a trait of one of the searched sentence has collision with one of the product traits, that searched sentence is defined as a collision sentence and the sentence filtering module 2246 removes that collision sentence from the search result. For example, the product traits include "winter, leather skirt and female," a searched sentence include traits of "female and summer." The sentence filter module 2246 checks the collision between the traits "female and summer" and the traits "winter, leather skirt and female," and finds that the trait "summer" collides with the trait "winter." As a result, the sentence filter module 2246 removes the sentence. After removing of all the collision sentences from the searched sentence, the execution of sentence filter module 2246 results in filtered sentences. In certain embodiments, the sentence filter module 2246 is further configured to count the filtered sentences. When the number of count is less than a threshold, the sentence filter module 2246 is configured to send the filtered sentences to the sentence variation module 2248, so as to generate more sentences. When the number of count is greater than a threshold, the sentence filter module 2246 is configured to send the filtered sentences to the sentence ranking module 2250 to rank those filtered sentences.

When the filtered sentences is less than a threshold, the user may not have enough sentences to choose from. Therefore, the sentence variation module 2248 is incorporated in the text generation module 224 to generate more sentences. In certain embodiments, even if the filtered sentences are greater than a threshold, the sentence variation module 2248 may still performs variation process to obtain variety of sentences. Kindly note that one purpose of providing variance sentences is to generate sufficient number of sentences for the user to choose from, while another purpose is to increase the variety of the generated sentences because advertisement content in the e-commerce context should avoid duplication—we should not make duplicated texts for different products from different manufactures.

Specifically, the sentence variation module 2248 is configured to, in response to receiving the filtered sentences from the sentence filtering module 2246, generate variance sentences of the filtered sentences. The sentence variation module 2248 is configured to generate variance sentences via different ways, including replacing word and changing syntactic structure. For wording method, words in the selected sentences can be replaced by their synonyms. The sentence variation module 2248 performs replacement following a set of rules—replacing words in certain area, with certain word class (e.g. verb, adjective, but no subject noun), and the same sentiment. Sentiment hereby refers to the attitude or opinion a word represents, and it can be positive, negative or neutual; for example, "horrible" is negative, "amazing" is positive, "movie" is neatual. In certain embodiments, the sentence variation module 2248 includes the function of analyzing the word class and the sentiment, and may use a customized or a public synonym dictionary. Below is an example, where a synonym "scares" replaces the word "frightened":

The bear chased the frightened squirrel. →The bear chased the scared squirrel.

Figure 4C:
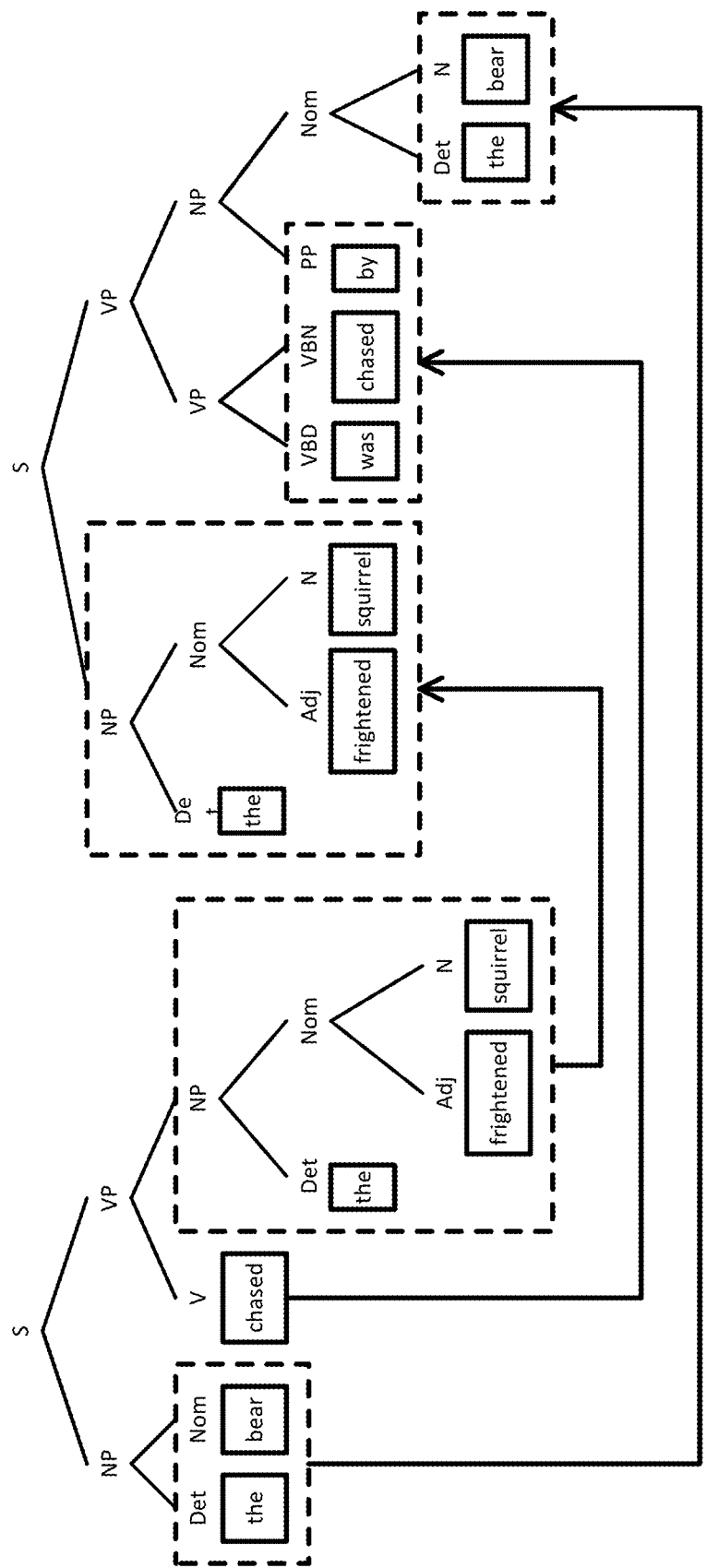
FIG. 4C schematically shows an example of parsing a searched sentence and re-organizing the parsed sentence in a different syntactic structure according to certain embodiments of the present disclosure.

For syntactic structure method (Manning'1999, incorporated here in its entirety by reference), the sentence variation module 2248 first extracts different syntactic structures from all the sentences in the database 2242. Then the sentence variation module 2248 parses the current searched sentence into syntactic components and reorganize the components into a different syntactic structure. FIG. 4C shows an example of parsing a searched sentence and re-organizing the parsed sentence in a different syntactic structure. As shown in FIG. 4C, the sentence variation module 2248 parsed the searched sentence into a grammar tree, and then applies the following formula to transfer the syntactic structure of the sentence:

Subject→object
Object→subject
Verb→is verb_passive by
adjust tense of "is" based on the tense of verb.

In certain embodiments, the above formula can be inverted, to transfer passive voice to active voice. After the variation. the sentence variation module 2248 is configured to provide those variance sentences to the sentence ranking module 2250.

The sentence ranking module 2250 is configured to, in response to receiving the filtered sentence from the sentence filtering module 2246 or the variance sentences from the sentence variation module 2248, rank the filtered sentences or the variant sentences based on the number of reflected product traits. An AI model is trained to give a score (from 0 to 1) to each [sentence, trait] pair. The score denotes the likelihood that the given sentence describes the given trait. The AI model was trained based on human labeled data but it is more accurate than human label, because (1) human label will mis-label some data but AI can save them back, e.g., even if a sentence describing a dress was not labeled as "dress" by human, the AI will still give it a high "dress" score, as long as AI recognizes the sentence contains texts describing a dress; (2) human label can only be 0 or 1 while a score ranged from 0 to 1 fit the real scenario better—mostly it is arbitrary to call a sentence describing a trait or not, e.g. "the dress is made by silk" is likely but not 100% to fit "summer", and thus giving a 0.8 likelihood score is better than a 1 label.

As described above, a filter is first applied to selected sentences without any collision with product attributes. The filtered sentences are then ranked based on the number of reflected product attributes. In certain embodiments, the sentence ranking module 2250 defines:

A={sentence traits: s, w}. Here for each sentence A having one or more related traits, each trait has a score s from 0-1 showing its likelihood with the sentence and a weight w showing the importance of the trait to readers.

B={product attributes}
m=dot(s(|AB|), w(|AB|)/|A|, where|A| means traits in A, |AB| means traits that in both A and B, s(|AB|) is a vector of scores of the traits |AB| with the sentence, w(|AB|) is a vector of the importance of the traits to readers. dot(,) means dot product.

w for each trait is decided by how likely a trait is perceived and labeled by human. For example, traits of "fabric" attribute will be perceived and thus labeled much more often than sentences describing "scene" attribute.

The metrics m is used to rank the sentences. The more product attributes a sentence reflects, the higher fit we may see between the sentence and the product. After obtains the rank of the sentences, sentence ranking module 2250 of the text generation module 224 is configured to send the ranked sentences to the article rendering module 226.

Figure 5:
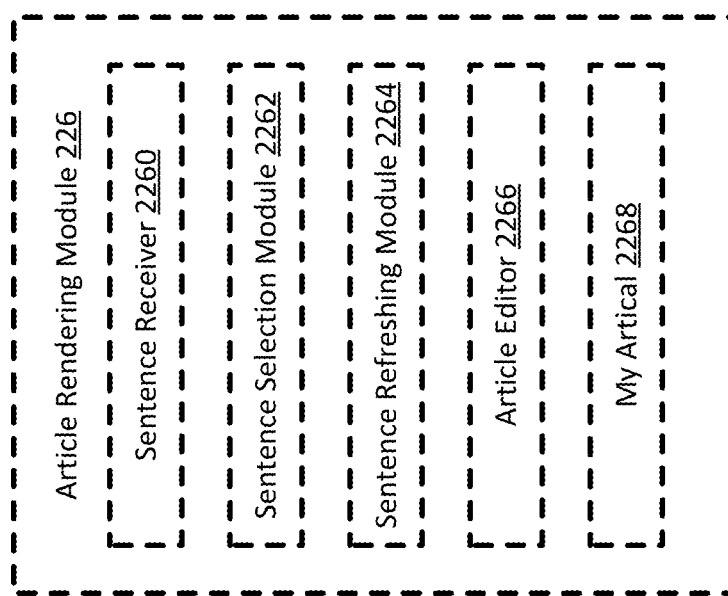
FIG. 5 schematically depicts an article rendering module according to certain embodiments of the present disclosure.

The article rendering module 226 is configure to, in response to receiving the ranked sentences, select sentences based on instruction from the user, rearrange and revise the selected sentences to form the article, and submits the article. In certain embodiments, the function of the article rendering module 226 is presented as a web interface by the user interaction module 228 to achieve interaction with the user. The article rendering module 226 has submodules and stored data. As shown in FIG. 5, the article rendering module 226 includes a sentence receiver 2260, a sentence selection module 2262, a sentence refreshing module 2264, an article editor 2266, and my article 2268. The sentence receive 2260 is configured to receive the sentences generated by the text generation module 224. The sentence selection module 2262 is configured to receive selection of the user from the generated sentences to obtain selected sentences. The sentence refresh module 2264 is configured to receive refresh instruction from the user to refresh generated sentences, so that the user can select sentences from the refreshed list of the generated sentences. The article editor 2266 is configured to receive instruction from the user to revise and rearrange the selected sentences. The my article 2268 is configured to, upon receiving instructions form the user, store the current revised and rearranged sentences as an article, or submit and display the article, for example, in an e-commerce website.

The sentence receiver 2260 is configured to receive the sentences from the sentence ranking module 2250 of the text generation module 224, and present the sentences to the user.

The sentence selection module 2262 is configured to, upon receiving a selection of a sentence from the ranked sentences by the user, send a notice to the sentence refreshing module 2264 and send the sentence to the article editor 2266.

The sentence refreshing module 2264 is configured to, upon receiving the notice that one sentence is selected by the user, refresh the generated sentences. Specifically, the sentence refreshing module 2264 is configured to instruct the text generation module 224 to generate a new set of sentences, based on not only the traits from the traits parsing module 222, but also the trait or traits corresponding to the selected sentence. For example, the trait corresponding to the selected sentence may be removed from the trait list for generating the new set of the sentences, or alternatively, the trait corresponding to the selected sentence is given a low weight during the generation of the new set of the sentence.

The operations of selecting a sentence by the sentence selection module 2262 and refreshing the generated sentences by the sentence refreshing module 2264 and the text generation module 224 may be repeated, until a sufficient number of sentences are selected by the user.

In certain embodiments, the sentence refreshing module 2264 may be activated by a specific operation, such as selection of a "refresh" button by the user. In other words, after selection of one sentence from the generated sentences, the article generation application 220 does not refresh the list of the sentences automatically, and the user can continue to select the next sentence from the list of the sentences. When the user has selected several sentences, and is not satisfied with the sentences left, he may manually click the "refresh" button, so as to instruct the text generation module 224 to generate a new set of sentences. Similar to the description above, the generation of the new set of sentences removes the traits corresponding to the selected sentences, or gives low weight to those traits.

In certain embodiments, when there are not many generated sentences, the user may also click the "refresh" button or a special "sentence variation" button, to increase the number of generated sentences. The increase of the listed sentences may include replacing word in the generated sentences or rearrange the syntactic structure of the generated sentences.

The article editor 2266 is configured to provide a method for the user to edit the selected sentences received from the sentence selection module 2262. The article editor 2266 may include re-arranging the sequence of the selected sentences, revising the words in the selected sentences, deleting a selected sentence, or add a new sentence between the selected sentences.

The my article 2268 is configured to, upon receiving an instruction from the user, store the revised sentences by the article editor 2266 into an article file, retrieve an article file from the storage, or submit an article to the e-commerce website.

In certain embodiments, the trait parsing module 222 and the text generation module 224 may each be performed using a deep learning algorithm.

Figure 6:
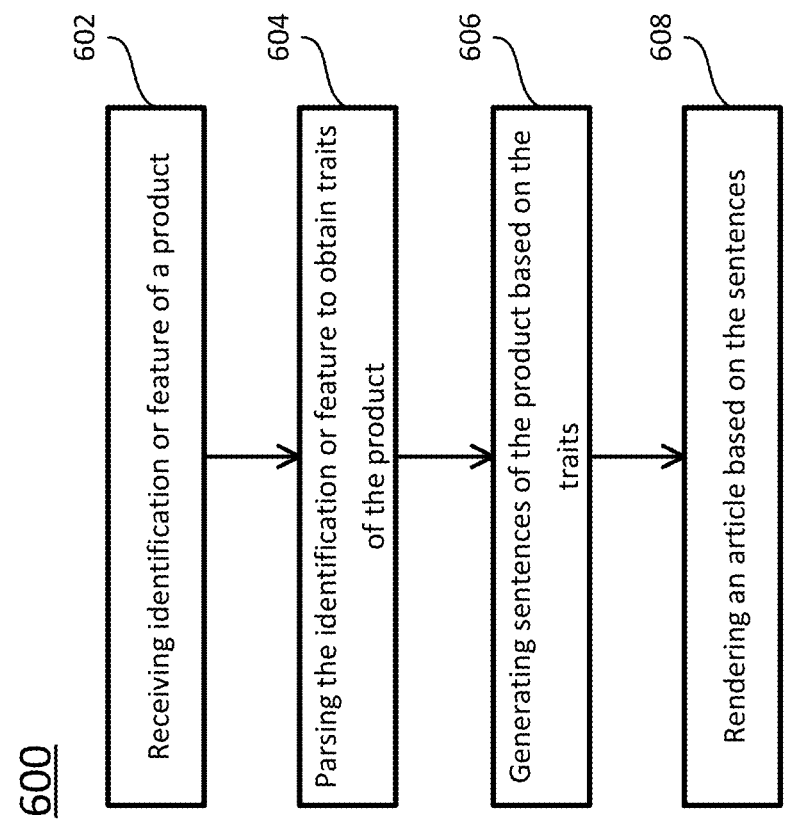
FIG. 6 schematically depicts a method for rendering an article according to certain embodiments of the present disclosure.

FIG. 6 schematically depicts a method for rendering an article according to certain embodiments of the present disclosure. In certain embodiments, the method is implemented by the server computing device 210 shown in FIG. 2. It should be particularly noted that, unless otherwise stated in the present disclosure, the steps of the method may be arranged in a different sequential order, and are thus not limited to the sequential order as shown in FIG. 6.

As shown in FIG. 6, at procedure 602, the trait parsing module 222 receives an input from a user via an interactive interface. The input may be an identification of a product, such as an SKU, or one or more keywords representing features of the product. For example, the keywords may include "red" to represent the color of the product, "dress" to represent the main category of the product, "summer" to represent the season that suitable for using the product, etc.

At procedure 604, upon receiving the identification or the feature of the product, the trait parsing module 222 parses the identification or the feature of the product to obtain one or more traits of the product, and sends the traits to the text generation module 224.

At procedure 606, upon receiving the traits from the trait parsing module 222, the text generation module 224 generates a plurality of sentences corresponding to the traits, and presents the generated sentences to the user through an interface, such as a graphic user interface provided by the web server.

At procedure 608, upon receiving editing instructions from the user on the generated sentences, the article rendering module 226 obtains the article, and stores or submit the article according to the user's instruction.

The method may provide a user interface to provide interactions with the user. For example, the method may be presented as a webpage. The webpage provides a enter box for the user to input identification or keywords through the webpage. In response, the method parses the input to obtain traits of the product, generates sentences, and presents the generated sentences to the user through the webpage. When presenting the generated sentences, the webpage provides function keys to the user, so that the user can select sentences from the generated sentences, rearrange and revise the selected sentences, refresh to obtain more sentences, save the article comprising the edited sentences, retrieve a saved article, or submitting the article to an e-commerce platform.

The step of 604 may be performed using deep learning, such as an AI, to correlate the inputted keywords with the traits efficiently and accurately. The number of keywords, the sequence of the keywords are considered as parameters for deep learning training and deployment. The step of 606 may be performed using deep learning, such as an AI, to correlate the inputted traits with the generated sentences efficiently and accurately. The number of traits, the sequence of the keywords, the selection of one or more sentences are considered as parameters for deep learning to select other sentences. In certain embodiments, the traits may be presented to the user so that the user can operate on the traits, such as deleting one of the traits, revising the traits, etc. In certain embodiments, the parsing step to obtain the traits are performed on the computing device but not presented to the user, and the user inputs the identification and keywords through the webpage, and obtains the sentences through the webpage.

Figure 7:
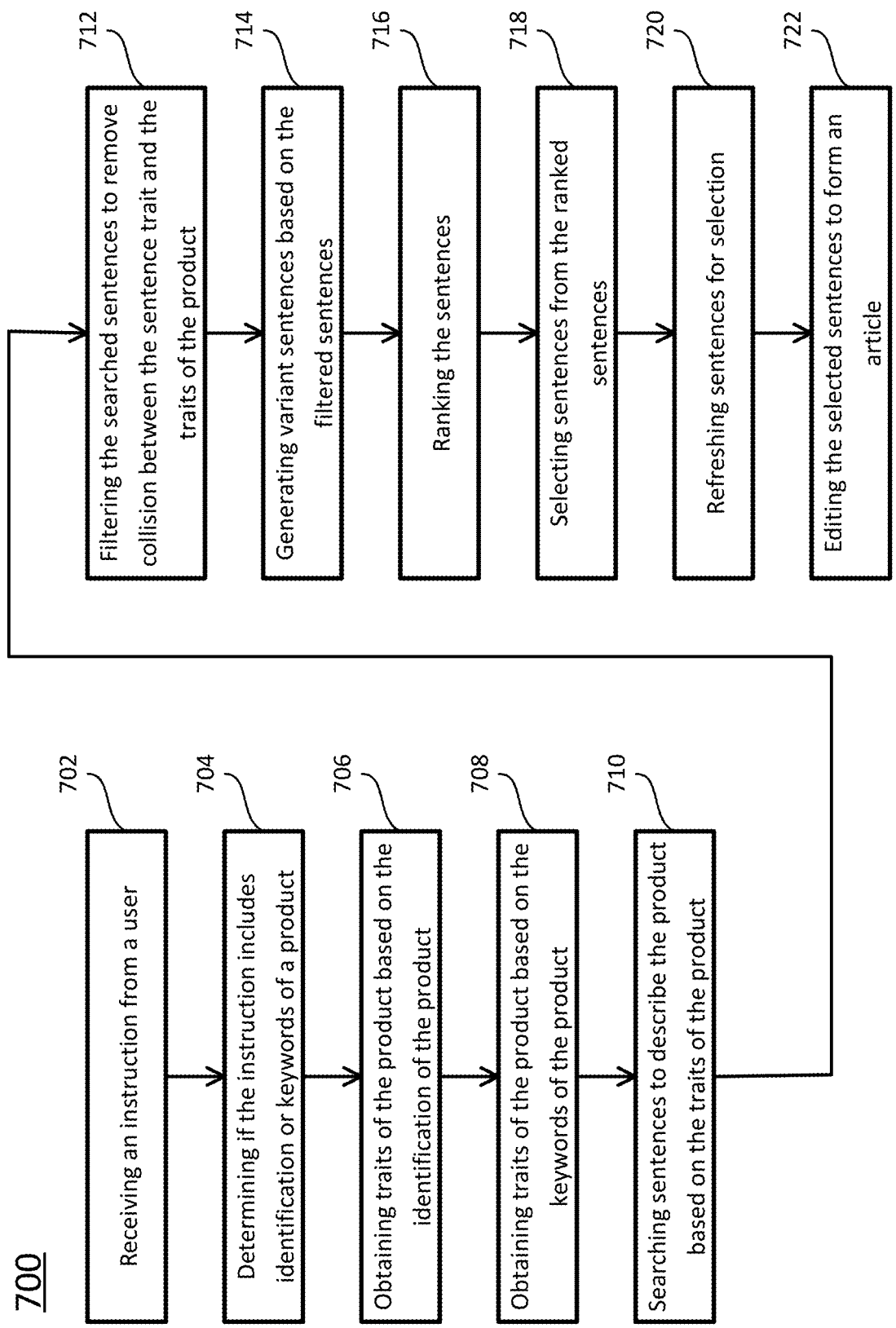
FIG. 7 schematically depicts a method for rendering an article according to certain embodiments of the present disclosure.

FIG. 7 schematically depicts a method for rendering an article according to certain embodiments of the present disclosure. In certain embodiments, the method is implemented by the server computing device 210 shown in FIG. 2. It should be particularly noted that, unless otherwise stated in the present disclosure, the steps of the method may be arranged in a different sequential order, and are thus not limited to the sequential order as shown in FIG. 7. In certain embodiments, the method shown in FIG. 7 is one detailed embodiment of the method shown in FIG. 6.

As shown in FIG. 7, at procedure 702, the user interaction module 228 of the computing device 210 provides a GUI on the user computing device 250 to a user, such that the user can interact with the article generation application 220 through the GUI; the user enters an identification of a product or features of the product through the GUI, and the identification and features are received by the request receiver 2220.

At procedure 704, the request receiver 2220 determines if the input from the user is the identification such as an SKU of the product, or one or more keywords representing the features of the product. If the input is the SKU, the request receiver 2220 sends the SKU to the SKU query module 2222; and if the input is the keywords, the request receiver 2220 sends the keywords to the synonym match module 2226.

At procedure 706, upon receiving the SKU of the product from the request receiver 2220, the SKU query module 2222 queries the SKU trait database 2224 using the SKU to retrieve the trait of the product, and sends the retrieved traits to the trait receiver 2240. The SKU trait database 2224 includes an entry of SKUs and an entry of traits corresponding to each SKU. The traits may be automatically generated and then manually reviewed, or manually labeled, or provided by a merchandise. In certain embodiments, the SKU trait database 2224 is part of a product database, where the product database, among other things, includes the SKUs and the corresponding traits. As described above, the retrieving of the traits of the product based on the SKU is straightforward.

At procedure 708, upon receiving the keyword of the product from the request receiver 2220, the synonym match module 2226 parses the keywords to obtain corresponding traits of the product. Based on the keywords, the synonym match module 2226 obtains the corresponding traits at different levels. Specifically, the synonym match module 2226 matches the keywords to the trait words in the trait list 2228. The trait list 2228 includes all the predefined product traits, such as descriptive, male, spring, red, cotton, thin, long, round, business, water proof, etc. When one of the keywords is matched exactly to one of the traits, that trait is retrieved directly from the trait list 2228. If each of the keywords has its corresponding traits, the synonym match module 2226 retrieves those traits as the result and sends the retrieved traits to the trait receiver 2240. If one or all of the keywords don't have direct corresponding traits, the synonym match module 2226 retrieves the traits based on the synonym dictionary 2230. In the synonym dictionary 2230, a plurality of words are each linked to a plurality of their synonym words. When the synonym match module 2226 finds a matched word to the keyword, and the matched word has a synonym that is a trait word, then the keyword is linked to the trait word. In certain embodiments, the synonym dictionary 2230 includes all the product traits in the dictionary. Therefore, there may be no need to have the trait list 2228, and the synonym match module 2226 queries the keywords directly against the synonym dictionary 2230.

When the synonym match module 2226 is unable to retrieve an exactly matched trait or synonyms of the trait based on a keyword, it then try to retrieve a surrogate matched trait. In other words, the synonym match module 2226 tries to find a trait most similar to the entered keyword.

When the user entered multiple keywords, some of the traits corresponding to some of the keywords may be obtained based on the synonym dictionary 2230, and some of the traits corresponding to some of the keywords may be obtained by finding the surrogate. The synonym match module 2226, after obtaining the traits based on the entered keywords, send the traits to the trait receiver 2240 of the text generation module 224.

Upon receiving the traits from the SKU query module 2222 when the input from the user is an SKU of the product or receiving the traits from the synonym match module 2226 when the input from the user is one or more keywords about the product, the trait receiver 2240 sends the traits to the sentence searching module 2244.

At procedure 710, in response to receiving the traits of the product, the sentence searching module 2244 searches sentences from the sentence-trait database 2242. Each sentence in the sentence-trait database 2242 is labeled with one or more traits. Search based on each trait results in a plurality of sentences, each sentence is labeled with the corresponding trait, and search based on multiple traits results in multiple group of sentences. The sentence searching module 2244 then sends those sentences to the sentence filtering module 2246.

At procedure 712, for each of the searched sentences, the sentence filtering module 2246 extracts traits from the sentence, and determines if the retrieved traits have collision with any of the traits received by the trait receiver 2240. If there are any collision, that sentence is deleted from the searched sentences. After checking collision for each of the searched sentences and delete the sentences having collision, the sentence filtering module 2246 obtains filtered sentences. If there are sufficient number of sentences for each trait, the sentence filtering module 2246 sends the filtered sentence to the sentence ranking module 2250. If the number of filtered sentences for one of the traits is less than a pre-determined number, such as 100 sentences, the sentence filtering module 2246 sends the filtered sentences to the sentence variation module 2248.

At procedure 714, the sentence variation module 2248, in response to receiving the number of filtered sentences corresponding to one of the traits (which number is less than, for example 100 sentences), increases the number of sentences by replacing a word in one or more of the sentences, or changing syntactic structure of the one or more of the sentences. Specifically, for each of the received fileted sentence, the sentence variation module 2248 first tries to replace a word in that sentence. When the word replacing is not successful, the sentence variation module 2248 then tries to switch the syntactic structure of the sentence. In certain embodiments, when the word replacing is successful, the sentence variation module 2248 would not try the switching of syntactic structure of the sentence; alternatively, the sentence variation module 2248 may try both word replacing and syntactic structure switching for each of the filtered sentences, so as to generate more sentences. The sentence variation module 224 then sends the sentences with increased number to the sentence ranking module 2250.

At procedure 716, in response to receiving the sentences from the sentence filtering module 2246 or the sentence variation module 2248, the sentence ranking module 2250 ranks the received sentences. The ranking considers the set of traits as a whole instead of individually, which means the more input traits a sentence carries, the higher ranked the sentence is in search result; the ranking also considers the order of sentences—sentence that carries the first expected traits are ranked higher than others; further, the ranking considers synergy of sentences, and refresh the ranking result when the user select one of the sentences. The sentence ranking module 2250 then sends the ranked sentence to the sentence receiver 2260 of the article rendering module 226.

In response to receiving the sentences, the sentence receiver 2260 presents the sentences to the user, for example via the GUI on the user computing device 250.

At procedure 718, upon receiving the selection by the user through the GUI, the sentence selection module 2262 selects the sentences. In certain embodiments, the user may select multiple sentences one by one or in a batch from the presented sentences. In certain embodiments, when the user select one sentence from the presented sentences, at procedure 720, the sentence refreshing module 2264 refreshes the presented sentences.

Then, at procedure 722, after selection of certain number of sentences, the article editor 2266 provides function through the GUI for the user to revise the sentences, rearrange the sentences, so as to form an article. After forming the article or the draft of the article, the my article 2268 provides function through the GUI for the user to save the article, retrieve an article, or submit the article to the e-commerce platform, so that the article is publicly accessible to customers.

Figure 8:
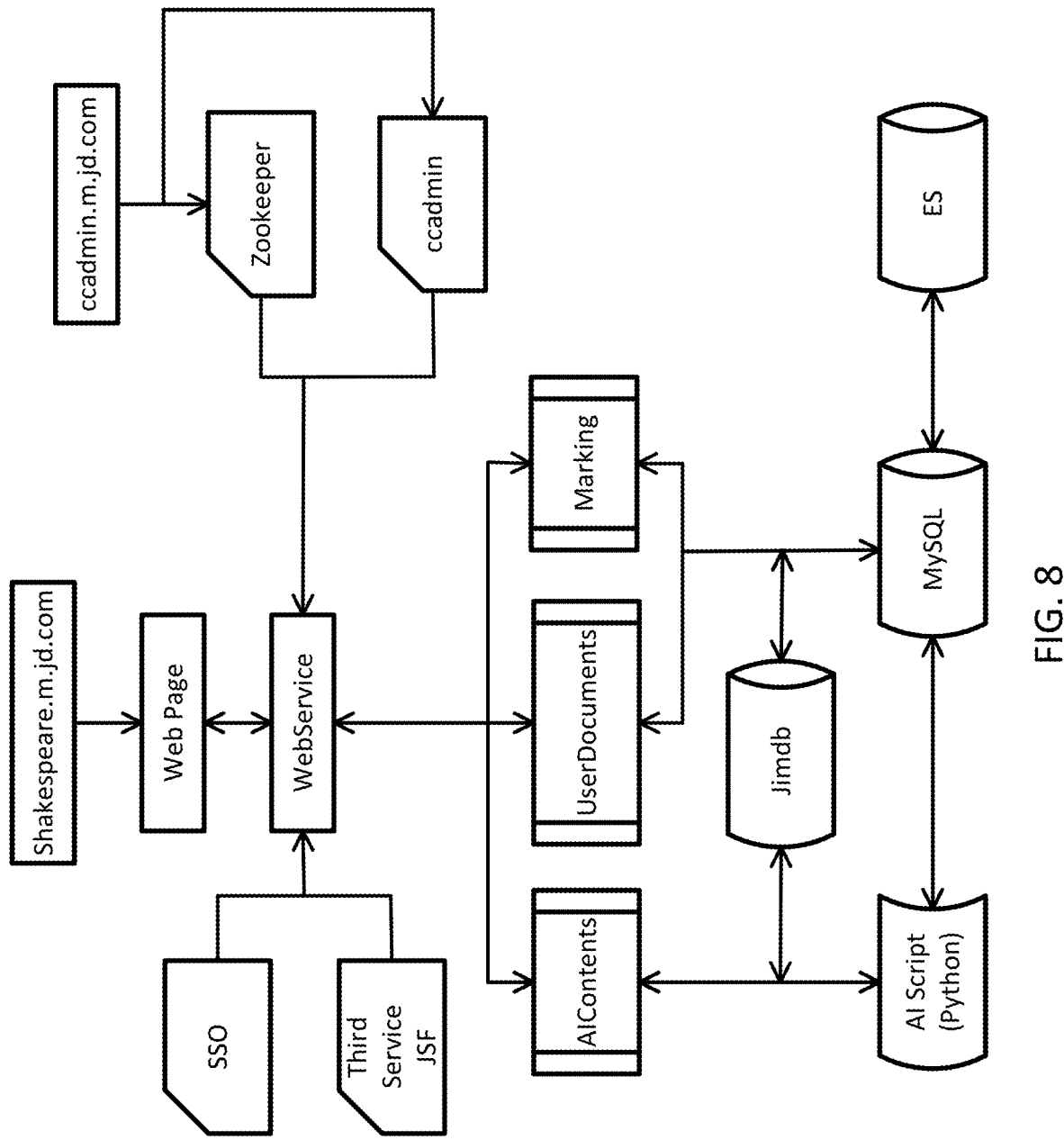
FIG. 8 schematically shows an engineering architecture according to certain embodiments of the disclosure.

FIG. 8 schematically shows an engineering architecture according to certain embodiments of the disclosure. As shown in FIG. 8, the architecture adopts Spring MVC design. The front-end webpage, back-end service, AI algorithms were developed separately in parallel and later integrated in back-end service.

The database uses MySQL and Jimdb (JD.COM internal cache technology). MySQL is for main transactions while Jimdb is an integrated cache store, for frequent repetitive query, used to alleviate load of MySQL. ElasticSearch technology is also applied specifically for searching Chinese characters.

The configuration control is enabled by Zookeeper and ccadmin (JD.COM internal cache technology) technology. Zookeeper serves as switch of service while ccadmin serves as an interface for custom setting.

Figure 9A:
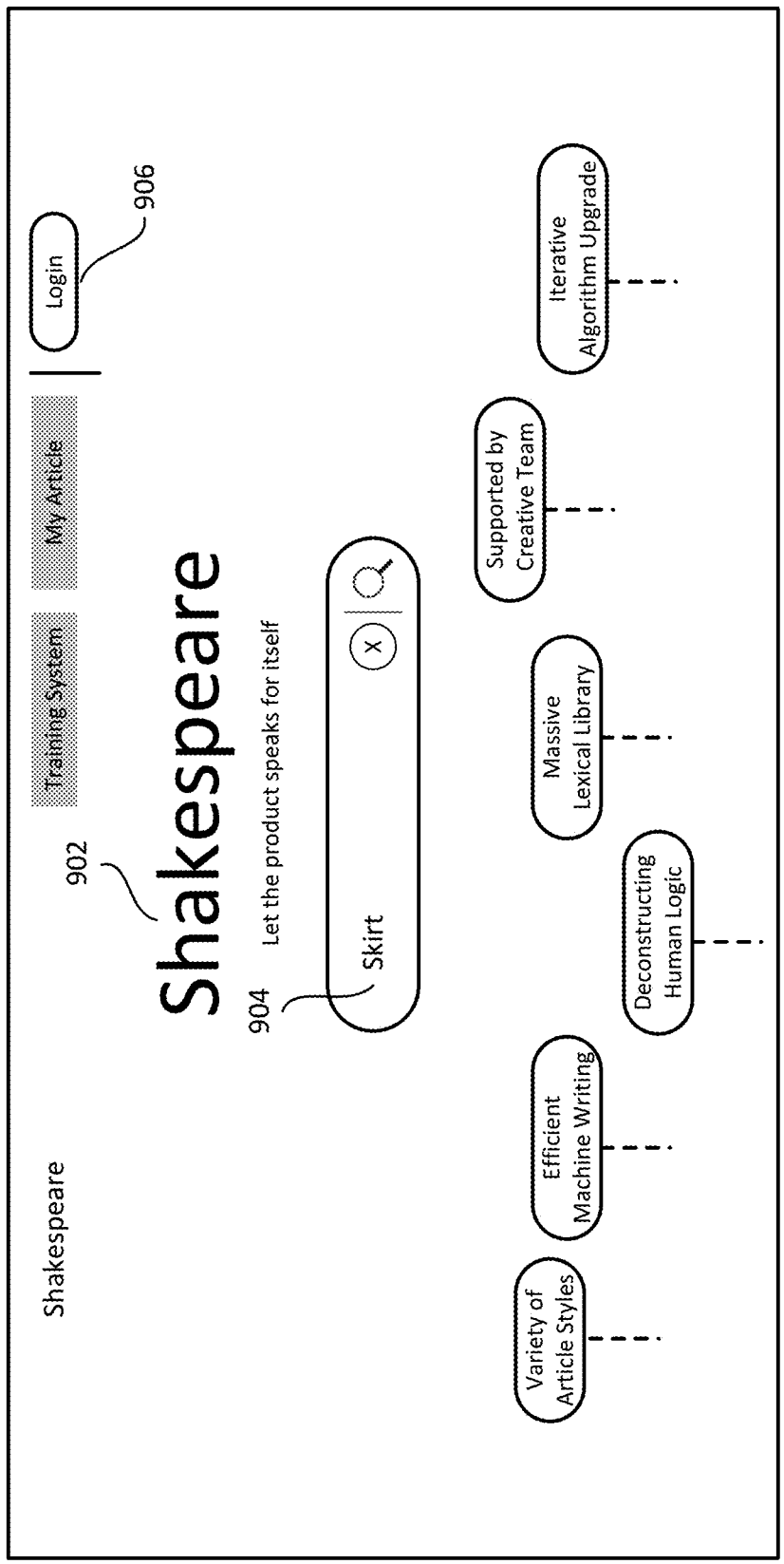

FIGS. 9A-9D schematically show an interface of article generation application according to certain embodiments of the disclosure. FIG. 9A shows the main webpage of the article generation application with the name Shakespeare ("莎士比亚" in Chinese) 902, where a text box 904 is provided such that a user may enter an identification of a product or keywords representing features of the product. The keyword entered as shown in FIG. 9A is "skirt" ("连衣裙" in Chinese). The main page also provide a login ("登录" in Chinese) key 906.

Figure 9B:
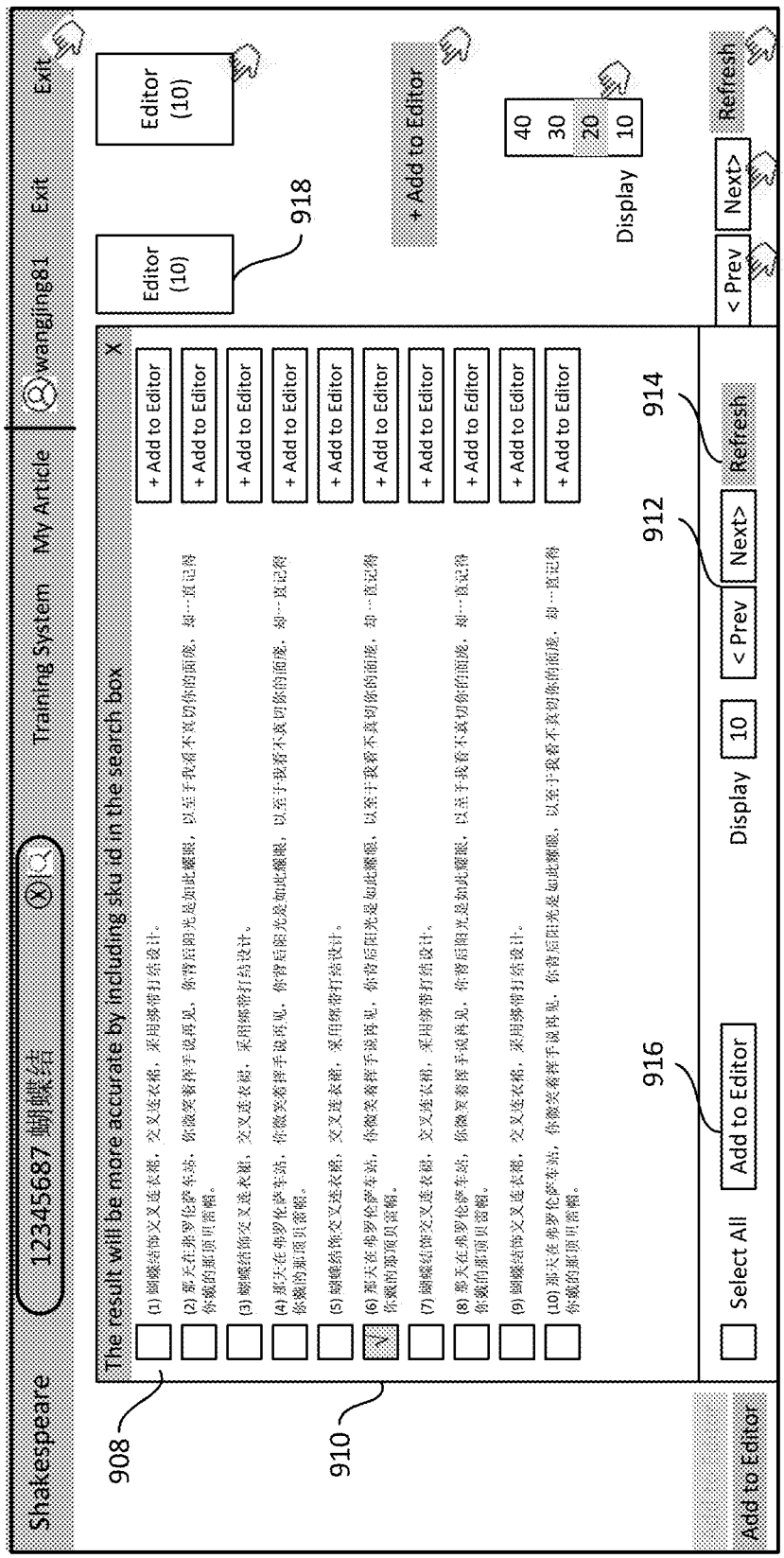

After entering the keyword, as shown in FIG. 9B, by the operation of the application using AI, a plurality of sentences 908 are listed based on the keyword. The user can select, for example the sentence 910 from the sentence list 908 shown on the webpage. If the user want to see more pages, he can use the "previous page" and "next page" keys 912 to browse more sentences; and if he want to see more variety of sentences, he can use the "refresh" key 914 to show different sentences. When the user click the "adding to editor" key 916, the selected sentence is transferred to the "editor" 918.

Figure 9C:
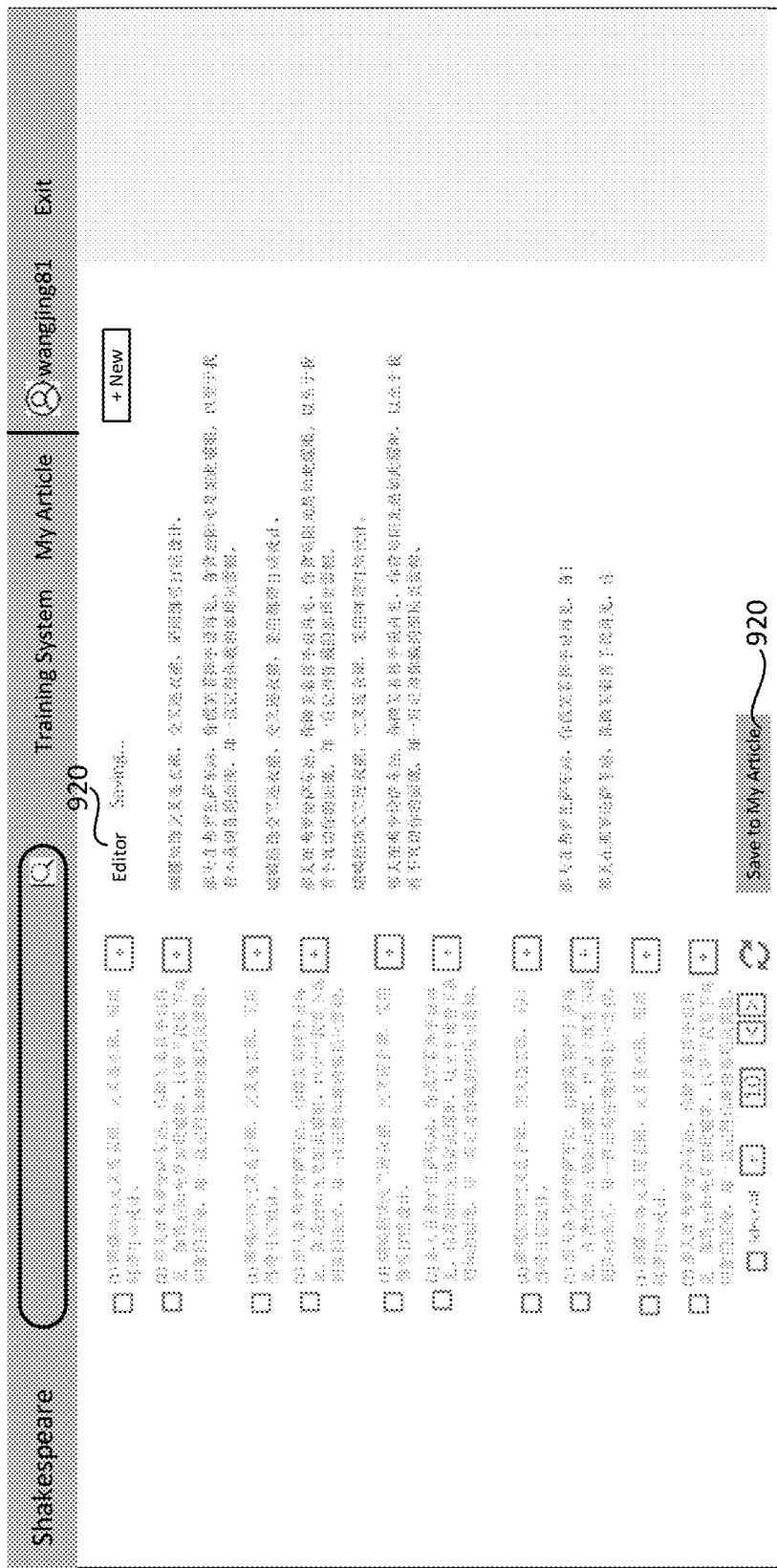

After selecting one or multiple sentences, as shown in FIG. 9C, the sentences can be edited in the editor 918. The left panel shows the previous selection page of FIG. 9B in a smaller scale, and the right panel of in FIG. 9C shows the main editor portion. The user can then use the editor 918 to revise the selected sentences and rearrange the sequence of the selected sentences. The bottom of the editor 918 has a "saving article" key 920 to save the revised sentences as an article file.

Figure 9D:
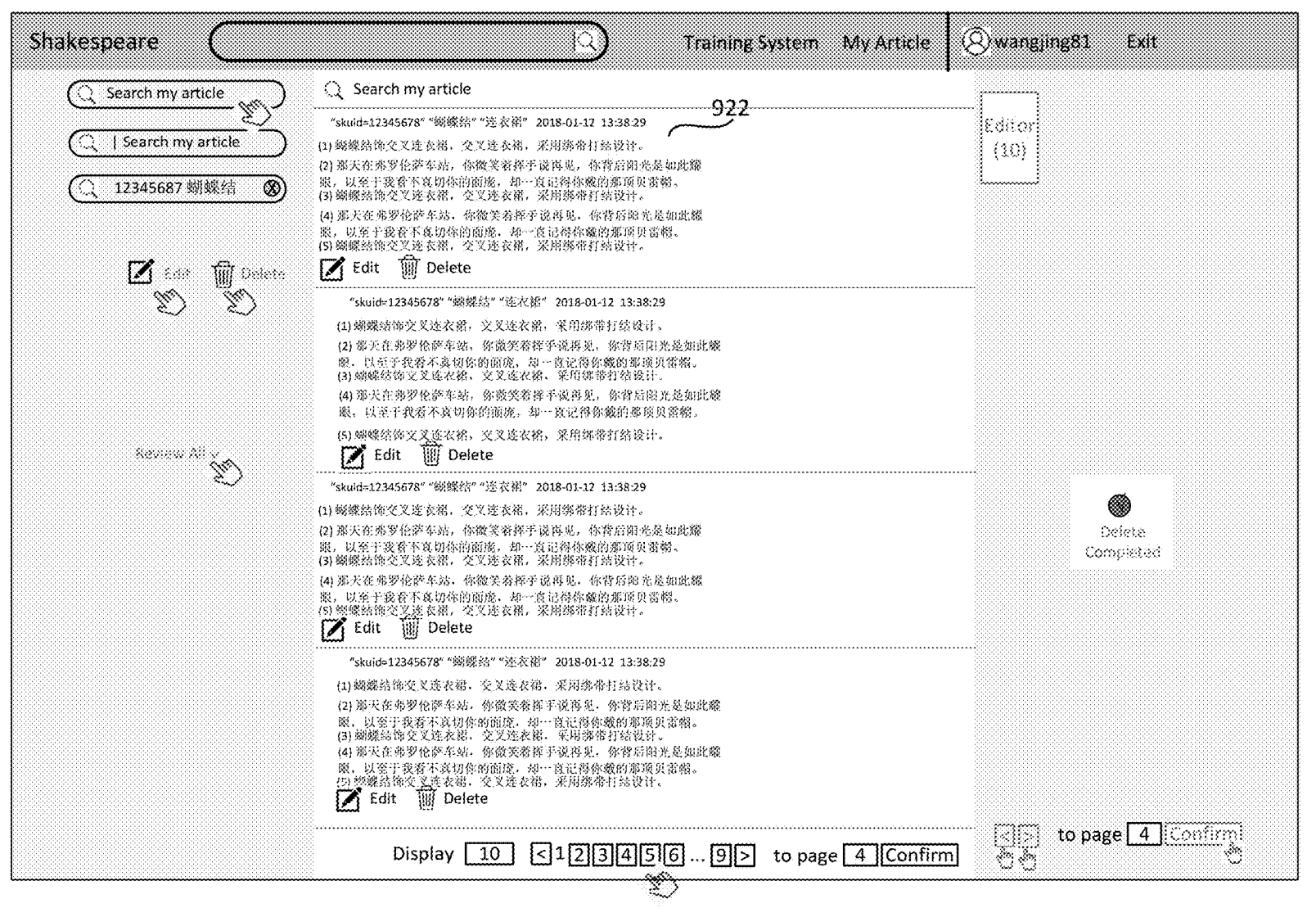

The user can save an article draft, retrieve an article draft, or submit the article to the e-commerce platform. As shown in FIG. 9D, multiple article drafts 922 are available to the user, and the user can choose any one of them to submit the draft as an article, delete the draft, or edit the draft again in the editor 918.

Figure 10:
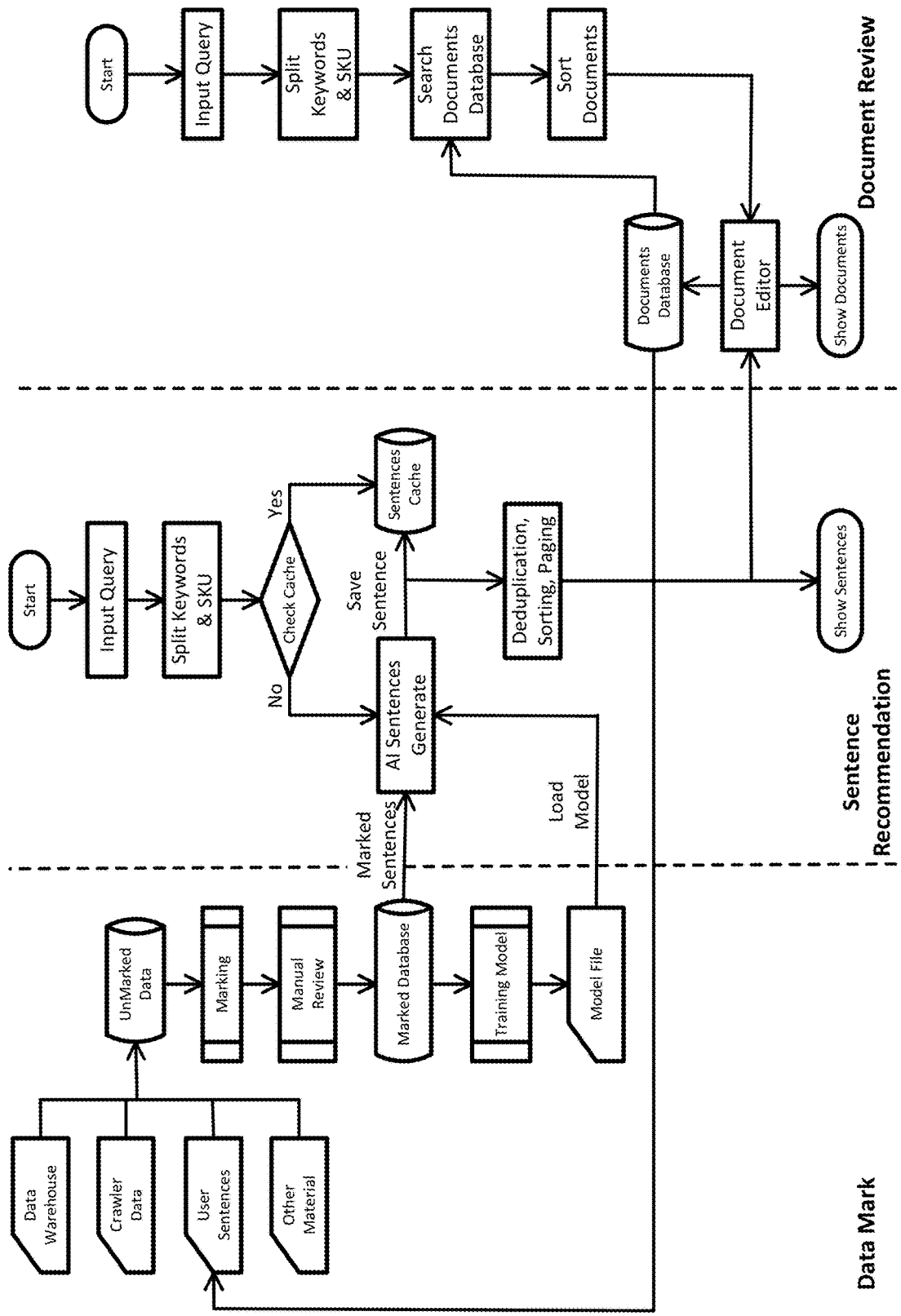
FIG. 10 shows a workflow according to certain embodiments of the disclosure.

FIG. 10 shows a workflow according to certain embodiments of the disclosure. As shown in FIG. 10, the workflow includes pats of: data mark or data labeling, sentence recommendation, and document review. The global workflow shows front end and back end operation of the application, and the details can be understood based on the descriptions above.

In summary, certain embodiments of the present disclosure provides an efficient article system, which is suitable for being used under e-commerce environment. It can scale up the article generation, the article generation work has a good quality, and the cost is low.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. Trevor Hastie, Robert Tibshirani, and Jerome H. Friedman. The elements of statistical learning, Springer, 2001.
2. Christopher Manning, Hinrich Schutze. Foundations of statistical natural language processing, The MIT Press, 1999.
3. M Melnik, J Alm, Does a seller's ecommerce reputation matter? Evidence from eBay auctions, The journal of industrial economics, 2002, vol. 50, pp. 337-349.
4. P Lee. Behavioral model of online purchasers in e-commerce environment, Electronic Commerce Research, 2002, vol. 2, pp. 75-85.
5. Y Zhang, Y Fang, K Wei, et al. Repurchase intention in B2C e-commerce—A relationship quality perspective, Information & Management, 2011, vol. 48, pp. 192-200.
6. J Walker, P Kim, J Jorasch, et al. Retail system for selling products based on a flexible product description, 2012, U.S. Pat. No. 8,799,100B2.
7. http://funeng.baidu.com/8.
8. Ehud Reiter and Robert Dale. Building Natural Language Generation Systems. Cambridge University Press, 2006.
9. https://docs.spring.io/spring/docs/3.2.x/spring-framework-reference/html/mvc.html
10. https://github.com/elastic/elasticsearch

What is claimed is:

1. A method for generating an article of a target product, the method comprising following steps implemented by a computing device:

receiving a request from a user, the request comprising at least one of a keyword and an identification of the target product;

determining at least one target trait of the target product based on the request;

generating a plurality of candidate sentences corresponding to the target trait;

selecting a plurality of target sentences from the candidate sentences based on an instruction from the user; and generating the article based on the target sentences, wherein the step of determining the at least one target trait comprises:

determining if the request comprises the keyword or the identification of the target product;

when the request comprises the identification of the target product: retrieving the at least one target trait from a trait database, the trait database comprising identifications of products and corresponding traits of the products; and when the request comprises the keyword of the target product: determining the at least one target trait by comparing the keyword of the target product to a synonym dictionary, dictionary words in the synonym dictionary comprising traits and synonyms of the traits.

2. The method of claim 1, wherein the identification of the target product is stock keeping unit (SKU) of the target product.

3. The method of claim 1, wherein the step of comparing the keyword to the synonym dictionary comprises: matching the keyword to the dictionary words, and when there is no match, calculating a similarity between the keyword and the dictionary words, and defining the dictionary word having the highest similarity to the keyword as the trait of the target product.

4. The method of claim 3, wherein the similarity between the keyword and the dictionary words are calculated using machine learning.

5. The method of claim 1, wherein the step of generating the plurality of candidate sentences comprises:
   selecting the candidate sentences corresponding to the target trait;
   determining collision between the candidate sentences and the target trait;
   removing the candidate sentences with collision to obtain filtered sentences;
   extracting traits reflected in each of the filtered sentences; and
   ranking the filtered sentences based on a fit value between reflected traits of each of the filtered sentences and the target traits of the product,
   wherein the fit value is calculated based on a number of same traits between the reflected traits of each filtered sentence and the target traits.

6. The method of claim 5, further comprising adding a new sentence to the filtered sentences, the new sentence being generated by: replacing a verb or an adjective in one of the filtered sentences by a synonym word.

7. The method of claim 5, further comprising adding a new sentence to the filtered sentences, the new sentence being generated by:
   parsing one of the filtered sentences into syntactic components; and
   reorganizing the syntactic components into a syntactic structure different from that of the one of the filtered sentences.

8. The method of claim 5, wherein the step of selecting the plurality of target sentences comprises:
   selecting one target sentence from the filtered sentences based on the ranking of the filtered sentences;
   removing the selected one target sentence from the filtered sentence, and re-ranking the rest of the filtered sentences; and
   selecting another target sentence from the rest of the filtered sentences that are re-ranked.

9. The method of claim 1, wherein the step of generating the article based on the target sentences comprises: providing an interface for revising the target sentences and re-arranging the target sentences.

10. A system for generating an article of a target product, the system comprising a computing device, the computing device comprising a processor and a storage device storing computer executable code, wherein the computer executable code, when executed at the processor, is configured to:
   receive a request from a user, the request comprising at least one of a keyword and an identification of the target product;
   determine at least one target trait of the target product based on the request;
   generate a plurality of candidate sentences corresponding to the target trait;
   select a plurality of target sentences from the candidate sentences based on an instruction from the user; and
   generate the article based on the target sentences,
   wherein the computer executable code is configured to determine the at least one target trait by:
   determining if the request comprises the keyword or the identification of the target product;
   when the request comprises the identification of the target product: retrieving the at least one target trait from a trait database, the trait database comprising identifications of products and corresponding traits of the products; and
   when the request comprises the keyword of the target product: determining the at least one target trait by comparing the keyword of the target product to a synonym dictionary, dictionary words in the synonym dictionary comprising traits and synonyms of the traits.

11. The system of claim 10, wherein the computer executable code is configured to compare the key word to the synonym dictionary by: matching the keyword to the dictionary words, and when there is no match, calculating a similarity between the keyword and the dictionary words, and defining the dictionary word having the highest similarity to the keyword as the trait of the target product.

12. The system of claim 11, wherein the similarity between the keyword and the dictionary words are calculated using machine learning.

13. The system of claim 10, wherein the computer executable code is configured to generating the plurality of candidate sentences by:
   selecting the candidate sentences corresponding to the target trait;
   determining collision between the candidate sentences and the target trait;
   removing the candidate sentences with collision to obtain filtered sentences;
   determining traits reflected in each of the filtered sentences; and
   ranking the filtered sentences based on a fit value between reflected traits of each of the filtered sentences and the target traits of the product,
   wherein the fit value is calculated by a number of same traits between the reflected traits of each filtered sentence divided by a number of the reflected trains of that filtered sentence.

14. The system of claim 13, wherein the computer executable code is further configured to add a new sentence to the filtered sentences by at least one of:
   replacing a verb or an adjective in one of the filtered sentences by a synonym word; and
   parsing one of the filtered sentences into syntactic components, and reorganizing the syntactic components into a syntactic structure different from that of the one of the filtered sentences.

15. A non-transitory computer readable medium storing computer executable code, wherein the computer executable code, when executed at a processor of a computing device, is configured to:
   receive a request from a user, the request comprising at least one of a keyword and an identification of the target product;
   determine at least one target trait of the target product based on the request;
   generate a plurality of candidate sentences corresponding to the target trait;

select a plurality of target sentences from the candidate sentences based on an instruction from the user; and
generate the article based on the target sentences,
wherein the computer executable code is configured to:
when the request comprises the identification of the target product: retrieve the at least one target trait from a trait database, the trait database comprising identifications of products and corresponding traits of the products; and
when the request comprises the keyword of the target product: determine the at least one target trait by comparing the keyword of the target product to a synonym dictionary, dictionary words in the synonym dictionary comprising traits and synonyms of the traits.

16. The non-transitory computer readable medium of claim 15, wherein the computer executable code is configured to generate the plurality of candidate sentences by:
selecting the candidate sentences corresponding to the target trait;
determining collision between the candidate sentences and the target trait;
removing the candidate sentences with collision to obtain filtered sentences;
determining traits reflected in each of the filtered sentences; and
ranking the filtered sentences based on a fit value between reflected traits of each of the filtered sentences and the target traits of the product,
wherein the fit value is calculated by a number of same traits between the reflected traits of each filtered sentence divided by a number of the reflected trains of that filtered sentence.

17. The non-transitory computer readable medium of claim 16, wherein the computer executable code is further configured to add a new sentence to the filtered sentences by at least one of:
replacing a verb or an adjective in one of the filtered sentences by a synonym word; and
parsing one of the filtered sentences into syntactic components, and reorganizing the syntactic components into a syntactic structure different from that of the one of the filtered sentences.

* * * * *